(12) United States Patent
Schollhammer et al.

(10) Patent No.: US 11,465,474 B2
(45) Date of Patent: Oct. 11, 2022

(54) SIDE RAIL

(71) Applicant: Oakmoore Pty Ltd, Salisbury (AU)

(72) Inventors: Wolfgang Schollhammer, Salisbury (AU); Zenon Theodoulou, Salisbury (AU); Michael Osman, Salisbury (AU)

(73) Assignee: Oakmoore Pty Ltd, Salisbury (AU)

( * ) Notice: Subject to any disclaimer, the term of this patent is extended or adjusted under 35 U.S.C. 154(b) by 0 days.

(21) Appl. No.: 17/058,331

(22) PCT Filed: May 30, 2019

(86) PCT No.: PCT/AU2019/050543
§ 371 (c)(1),
(2) Date: Nov. 24, 2020

(87) PCT Pub. No.: WO2019/227160
PCT Pub. Date: Dec. 5, 2019

(65) Prior Publication Data
US 2021/0213812 A1    Jul. 15, 2021

(30) Foreign Application Priority Data

May 31, 2018    (AU) ................................ 2018901954

(51) Int. Cl.
   *B60J 7/06*           (2006.01)

(52) U.S. Cl.
   CPC ..................................... *B60J 7/068* (2013.01)

(58) Field of Classification Search
CPC ... B60J 7/068; B60J 7/106; B60J 7/198; B60J 7/141
USPC .................... 296/98, 100.09, 136.03, 100.17
See application file for complete search history.

(56) References Cited

U.S. PATENT DOCUMENTS

| 5,040,843 A | 8/1991 | Russell et al. |
| 5,228,736 A | 7/1993 | Dutton |
| 5,330,246 A * | 7/1994 | Bernardo ................. B60J 7/068 160/130 |

(Continued)

FOREIGN PATENT DOCUMENTS

| WO | 1998/032943 A1 | 7/1998 |
| WO | 9832943 A1 | 7/1998 |

OTHER PUBLICATIONS

International Search Report and Written Opinion for PCT/AU2019/050543 dated Aug. 15, 2019 (9 pages).

(Continued)

*Primary Examiner* — Joseph D. Pape
*Assistant Examiner* — Veronica M Shull
(74) *Attorney, Agent, or Firm* — Oakmoore Pty Ltd

(57) ABSTRACT

A side rail for a cargo bed of a vehicle enables the fitting or mounting of a broad range of automotive accessories to a roll top cover. The side rail comprises: an elongate body that defines a longitudinal axis; an axially extending drive channel disposed at a medial side of the body and defining an opening therein for receiving a drive chain, the drive channel having a recessed inner portion and a stepped outer portion adjacent the opening; an axially extending first support channel recessed in an upper side of the body and opening upwardly therefrom; and an axially extending second support channel recessed in the upper side of the body and opening upwardly therefrom, the second support channel disposed laterally adjacent to the first support channel.

18 Claims, 5 Drawing Sheets

(56) References Cited

U.S. PATENT DOCUMENTS

| | | | |
|---|---|---|---|
| 5,584,521 A | 12/1996 | Hathaway | |
| 6,669,264 B1* | 12/2003 | Tucker | B60J 7/104 296/100.15 |
| 7,954,876 B2* | 6/2011 | Kosinski | B60J 7/102 296/98 |
| 9,381,794 B2 | 7/2016 | Gomes et al. | |
| 10,328,778 B2 | 6/2019 | Aubrey et al. | |
| 2016/0114666 A1* | 4/2016 | Xu | B60J 7/141 296/100.07 |
| 2017/0001499 A1* | 1/2017 | Facchinello | B60J 7/106 |
| 2018/0118002 A1 | 5/2018 | Koengeter et al. | |

OTHER PUBLICATIONS

International Search Report and Written Opinion for PCT/AU2019/050542 dated Aug. 15, 2019 (8 pages).

Non-Final Office Action dated Nov. 9, 2021 for related U.S. Appl. No. 17/058,325 (21 pages).

* cited by examiner

SIDE RAIL

CROSS-REFERENCE TO RELATED APPLICATIONS

This application is a national stage of, and claims priority to, Patent Cooperation Treaty Application No. PCT/AU2019/050543, filed on May 30, 2019, which application claims priority to Australian Patent Application No. AU2018901954, filed on May 31, 2018, which applications are hereby incorporated herein by reference in their entireties.

BACKGROUND

Numerous types of truck bed covers can be arranged over the utility or cargo bed portion of a ute or pickup truck to secure and protect the bed including cargo items disposed therein. In particular, roll top covers generally include a motorized or mechanical drive system for operably covering and uncovering the top of an open cargo bed, truck box or the like by way of an extendable and retractable slat assembly.

Prior art roll top covers can suffer from a number of drawbacks. By way of example, such roll top covers may not be fully weather resistant and/or impervious to moisture and dust. Additionally, the frictional forces that are produced between the drive chain and the associated drive chain track or rail during operation (i.e., opening and/or closing) of the roll top cover can be significant so as to make closing and/or opening difficult for a user. Further to this, movement or vibration of the slats of the roll top cover can result in the production of undesirable noise during operation of the associated vehicle.

Accordingly, an improved roll top cover that overcomes one or more of the above disadvantages is required.

BRIEF DESCRIPTION OF THE DRAWINGS

To assist in understanding the disclosure and to enable a person skilled in the art to put the disclosure into practical effect, the disclosure will be described by way of example only with reference to the accompanying drawings, in which.

DETAILED DESCRIPTION

Figure 1:
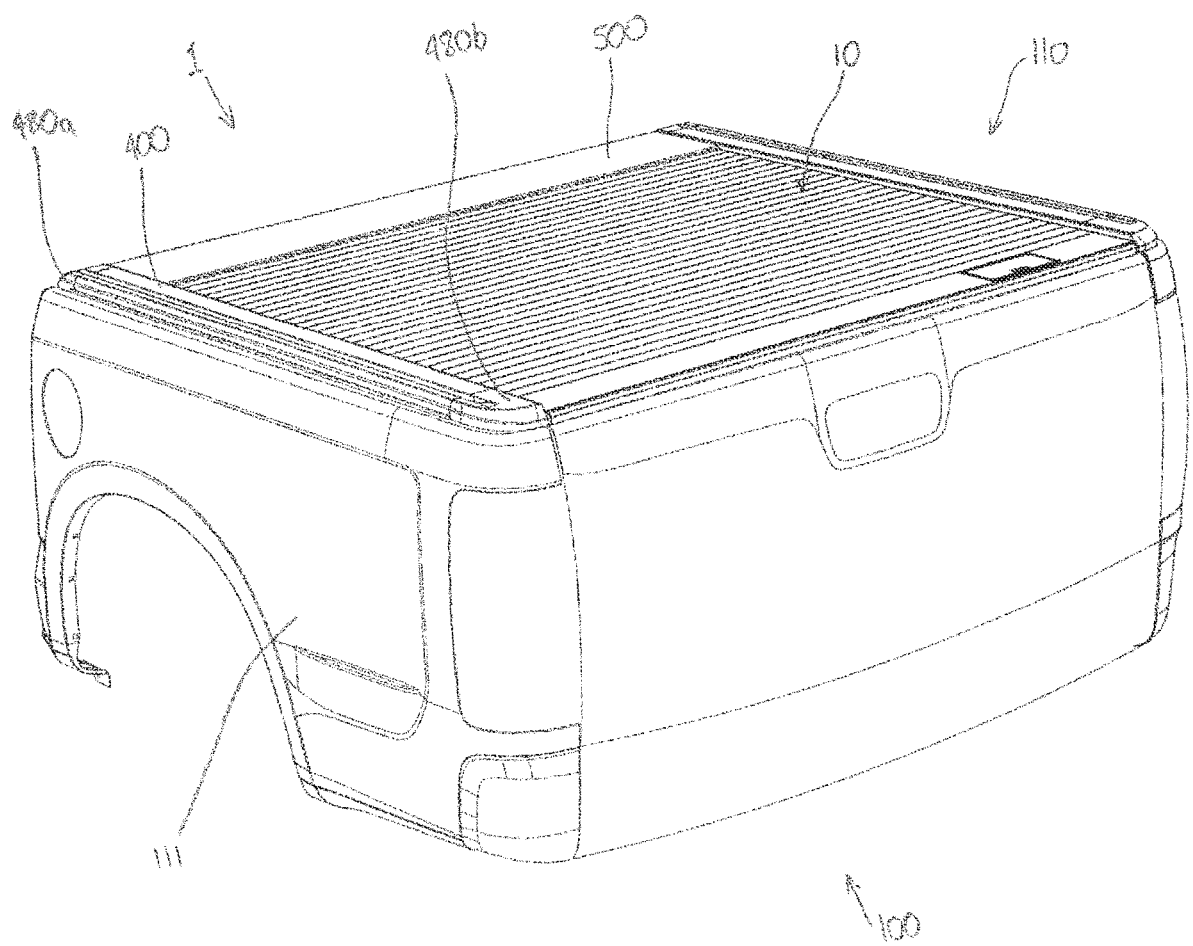
FIG. 1 is a top-down perspective view of a roll top cover suitably installed on a vehicle.

The present disclosure relates to a side rail for inclusion in a roll top cover that is operable between an extended or closed position and a retracted or open position when installed on a cargo bed of a vehicle, such as pickup trucks and utility vehicles. Elements of the disclosure are illustrated in concise outline form in the drawings, showing only those specific details that are necessary to understand the examples of the present disclosure, but so as not to provide excessive detail that will be obvious to those of ordinary skill in the art in light of the present description.

In this specification, adjectives such as first and second, top and bottom, upwards and downwards, and the like may be used solely to distinguish one element or action from another element or action without necessarily requiring or implying any actual such relationship or order. Words such as "comprises" or "includes" are intended to define a non-exclusive inclusion, such that a method or apparatus that comprises a list of elements does not include only those elements but may include other elements not expressly listed, including elements that are inherent to such a method or system.

In a first aspect, although not necessarily the only aspect or the broadest aspect, the disclosure includes a side rail for a cargo bed of a vehicle comprising:

an elongate body that defines a longitudinal axis;

an axially extending drive channel disposed at a medial side of the body and defining an opening therein for receiving a drive chain, the drive channel having a recessed inner portion and a stepped outer portion adjacent the opening;

an axially extending first support channel recessed in an upper side of the body and opening upwardly therefrom; and an axially extending second support channel recessed in the upper side of the body and opening upwardly therefrom, the second support channel disposed laterally adjacent to the first support channel.

Suitably, the side rail is for operation of a roll top cover and/or a tonneau cover.

In one example, the second support channel is recessed from the first support channel to define a stepped arrangement.

In particular examples, one or both of the first and second support channels is a U-shaped channel having opposed lip portions extending toward one another.

In some examples, the side rail further comprises a first cover element engaged with the first support channel.

In certain examples, the side rail further comprises a second cover element engaged with the second support channel.

One or both of the first and second support channels may be configured for receiving at least partly therein one or more automotive accessories. The one or more automotive accessories may be selected from the group consisting of a railing system, a trim element, a sail plane element, a sports bar element, a canopy, a cabin guard, a storage rack and any combination thereof.

In one example, front and/or rear end portions of the body include a respective end cap engaged thereto.

In certain examples, the recessed inner portion defines a gutter.

The side rail may further comprise:

a first receiving channel disposed within an upper wall of the outer portion of the drive channel and extending axially therealong;

a first sealing member disposed within the first receiving channel;

a second receiving channel disposed opposite the first receiving channel within a lower wall of the outer portion of the drive channel and extending axially therealong; and a guide element disposed within the second receiving channel and projecting upwardly therefrom, the guide element having an upper contact surface for slidably contacting a surface of the drive chain.

In one example, the side rail further comprises:

a third receiving channel positioned between and adjacent the second receiving channel and the opening; and a second sealing member disposed within the third receiving channel.

The first sealing member may comprise a base positioned within the first receiving channel and a pair of curved projections extending therefrom into the drive channel for contacting an upper surface of the drive chain and/or a slat of the roll top cover.

In some examples, the second sealing member curves upwardly and medially into the drive channel.

The side rail may further comprise:

a fourth receiving channel recessed in a lower side of the body and extending axially therealong, the fourth receiving channel adjacent a lateral edge portion of the lower side; and a third sealing member disposed within the fourth receiving channel and extending laterally therefrom so as to overlie the lateral edge portion In another aspect, the disclosure includes a roll top cover assembly for operably covering a cargo bed of a vehicle, comprising the side rail of the aforementioned aspect.

In a further aspect, the disclosure includes a tonneau cover for operably covering a cargo bed of a vehicle, comprising the side rail of the first mentioned aspect.

Particular advantages of some examples of the side rail include providing improved and smoother control and operation of an associated drive chain and slat assembly that significantly reduces any movement, in particular twisting and/or side to side movement, therebetween. A further advantage resides in the provision of a side rail that contributes to the drainage of any debris, fluids, dust and the like away from the roll top cover as well as prevents or minimises such debris, fluids, dust and the like from entering the cargo bed of the vehicle. Certain embodiments of the present side rail also advantageously allow for the fitting or mounting of a broad range of automotive accessories to the roll top cover.

FIGS. 1 to 5 provide a side rail. As illustrated in FIG. 1, the side rail 400 is configured for being part of a roll top cover 1 for covering a cargo bed 110 of a vehicle 100. In the embodiment provided, the side rail 400 is configured to be operably coupled to a drive chain 300 and an associated slat assembly 10 so as to allow for slidable movement of the roll top cover 1 between an open or retracted position and a closed or extended position, as illustrated by FIG. 1. The slat assembly 10 is constructed of a plurality of successive and pivotably interconnected slats 11. Similarly, the drive chain 300 comprises a plurality of successive and pivotably interconnected drive chain elements 301, with each drive chain element 301 engaged to opposed side portions or end walls of a single slat 11.

Figure 2:
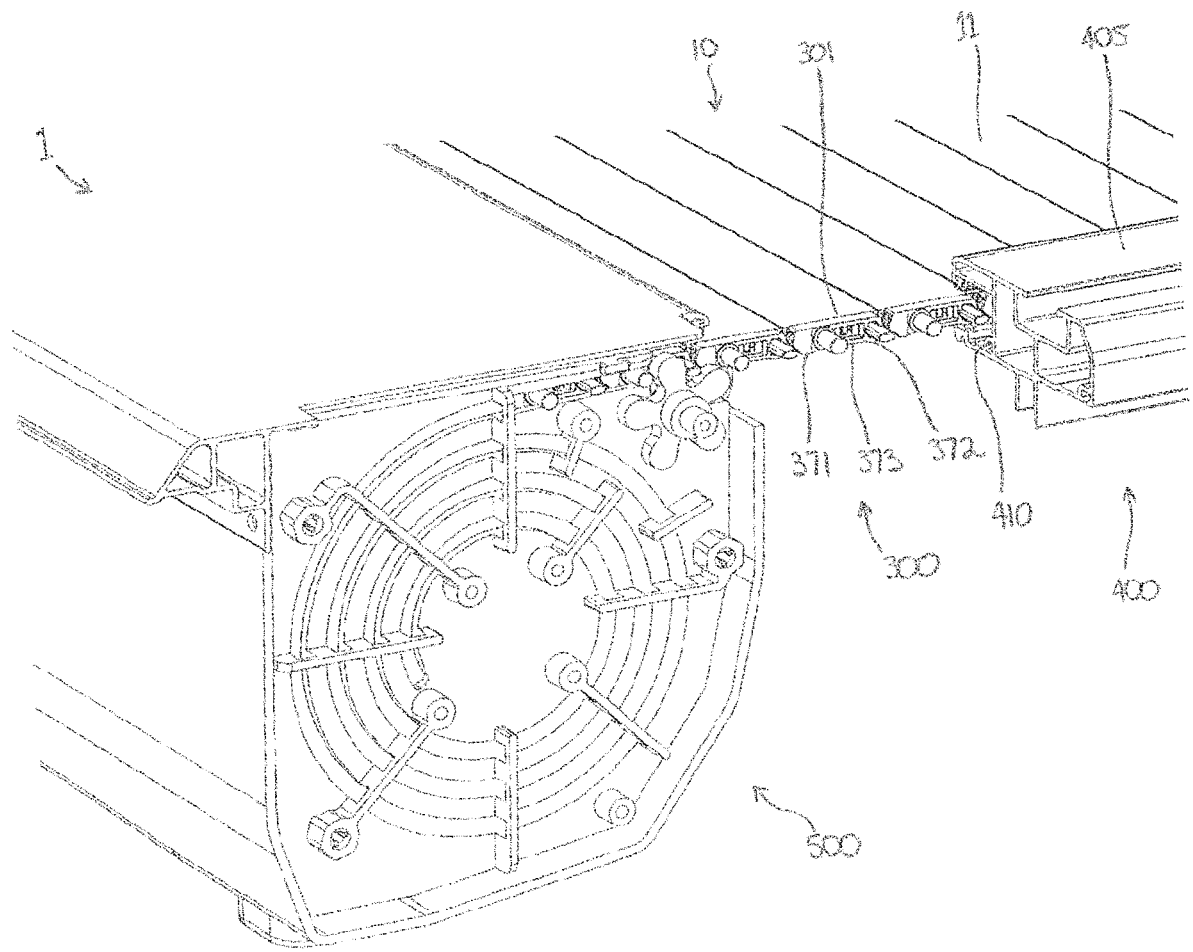
FIG. 2 illustrates a perspective view of a side rail for operation of the roll top cover of FIG. 1 prior to installation on a vehicle.
Figure 3:
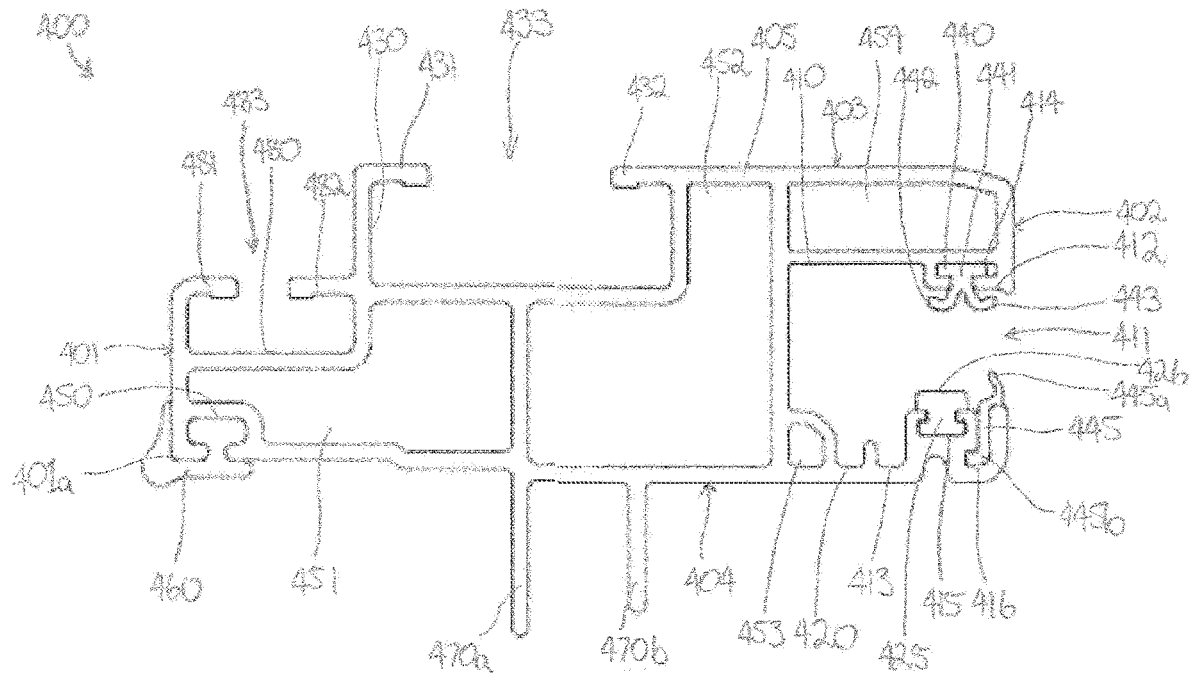
FIG. 3 is a cross-sectional view of the side rail of FIG. 2.
Figure 4:
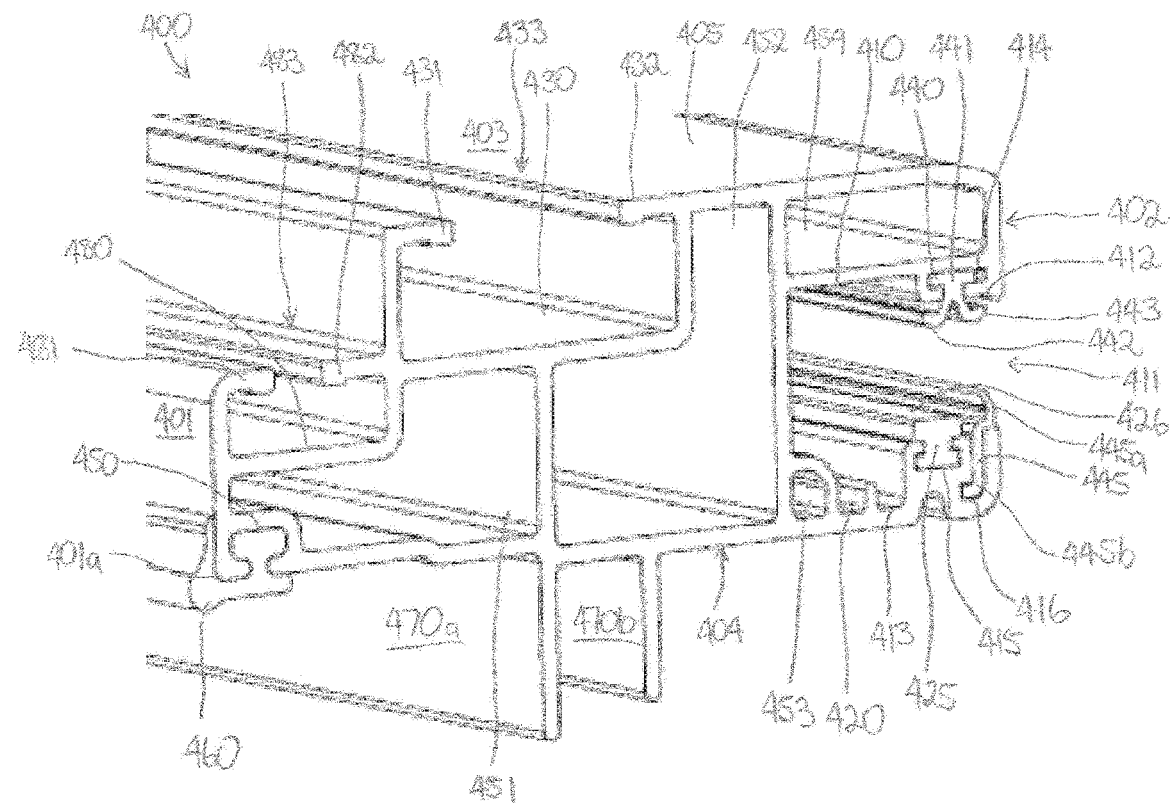
FIG. 4 illustrates an end-on perspective view of the side rail of FIG. 2.

As shown in FIGS. 2 to 4, each drive chain element 301 is configured for operably connecting its respective slat 11 to the side rail 400. From FIG. 2, it can be observed that the roll top cover 1 is operable by way of a drive system 500 to move between the extended position, in which the slats 11 of the slat assembly 10 are arranged and extend between opposed side rails 400 so as have the respective upper surfaces thereof substantially flush theretogether and thereby define a substantially flattened or planar arrangement of the slat assembly 10 (i.e., to restrict access to the underlying cargo bed 110, see FIG. 1), and the retracted position, in which the slat assembly 10 attains a substantially curved or spiral arrangement so as to enable a user access to the cargo bed 110 thereunder.

Figure 5:
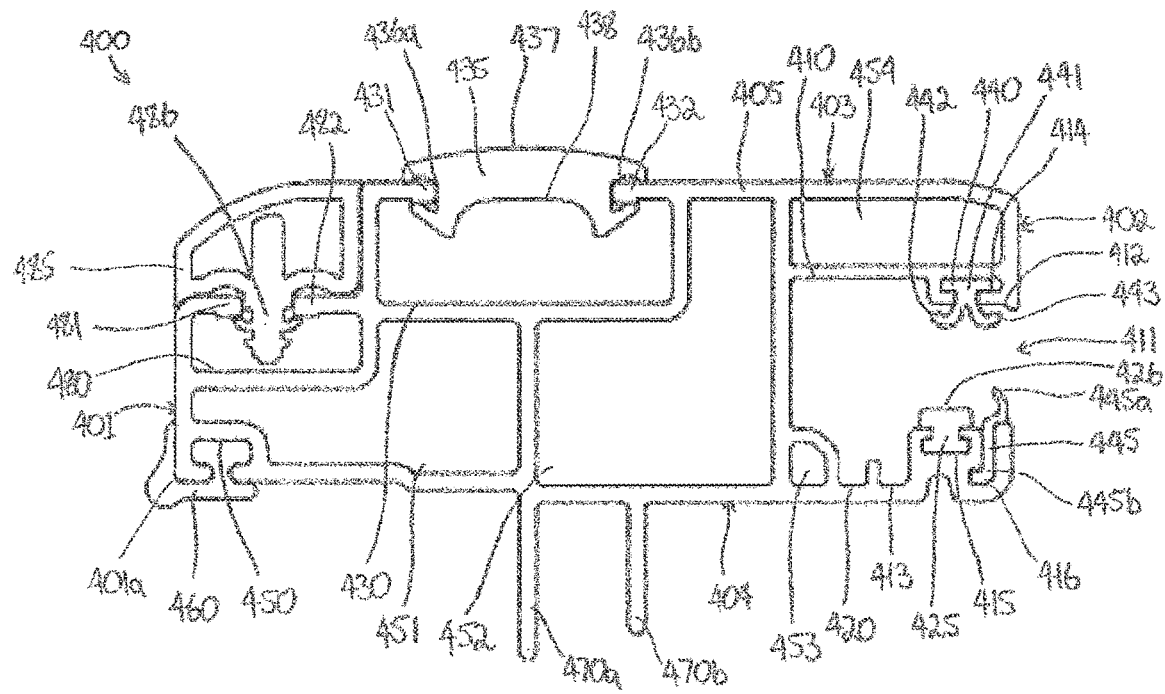
FIG. 5 is a cross-sectional view of the side rail of FIG. 2 with a cover strip and a cover bar mounted thereon.

Referring to FIGS. 3 to 5, the side rail 400 includes an elongate body 405 having a length and first and second ends and further being defined by opposed lateral and medial sides 401,402 as well as opposed upper and lower sides 403,404. It will be appreciated that the sides 401-404 define a relatively low profile of the side 400 when in cross-section. Opening outwardly or laterally from the medial side 402 of the body 405 is a T-shaped drive channel 410. In this manner, the drive channel 410 defines an opening 411 that extends along the length of the body 405. As shown in FIG. 2, the opening 411 is configured to receive therein or therethrough a portion of the drive chain 300 and/or the associated slat assembly 10 so as to allow for slidable movement thereof within the drive channel 410 in first and second directions (i.e., forward and rearward directions relative to the cargo bed 110 of the vehicle 100).

The drive channel 410 includes a stepped or narrowed lateral or outer portion 412 that defines the opening 411 and a recessed medial or inner portion 413. A lower portion of the recessed inner portion 413 defines a gutter 420 for receiving and draining any debris, dust, fluids and the like that have migrated from the drive chain 300 and/or slat assembly 10 through the outer portion 412 of the drive channel 410.

Disposed in an upper wall or portion of the outer portion 412 and adjacent the opening 411 of the drive channel 410 and extending therealong is a first receiving slot or channel 414. In this manner, the first receiving channel 414 defines a T-shaped space or slot that opens downwardly into the outer portion 412 of the drive channel 410. The outer portion 412 further includes second and third receiving channels 415,416 that are each disposed opposite the first receiving channel 414 in a lower portion of the outer portion 412 of the drive channel 410. Similar to the first receiving channel 414, the second receiving channel 415 defines a T-shaped space or slot that opens upwardly into the drive channel 410. The third receiving channel 416 is positioned adjacent and spaced laterally from the second receiving channel 415 and adjacent the opening 411 medially, which defines a J-shaped space or slot that opens upwardly into the drive channel 410.

As can be observed from FIGS. 3 to 5, a first sealing member 440 is disposed within the first receiving channel 414. The first sealing member 440 comprises a base 441 that is rectangular in cross-section and of suitable dimensions for being securely and frictionally received within the first receiving channel 414. Extending downwardly from the base 441 are first and second curved projections 442,443 that are angularly disposed with respect to each other, such that each curved projection 442,443 is configured to contact an upper surface of the drive chain 300 and/or the slat assembly 10. In this regard, the first curved projection 442 extends or is angled laterally or outwardly towards the opening 411 defined by the drive channel 410, whilst the second curved projection 443 extends or is angled medially or inwardly towards the recessed inner portion 413. As a result of this arrangement, the first sealing member 440 helps to not only prevent or minimise debris, dust, fluids and the like from entering the drive channel 410 and ultimately the gutter 420, but also acts to reduce the movement or splashing of such debris, dust, fluids and the like out of the gutter 420 once drained or collected therein. As such, this arrangement advantageously acts to keep the cargo bed 110 dry.

Further to the above and disposed within the third receiving channel 416 is an elongate second sealing member 445 that projects upwardly therefrom and extends longitudinally at least partly the length of the body 405. To this end, a first end 445a of the second sealing member 445 curves upwardly and inwardly into the drive channel 410 so as to be configured to slidingly abut or contact a lower or bottom surface of each of the overlying drive chain elements 301 and/or the slats 11 as they move thereover in the first or second direction within the drive channel 410. A second end 445b of the second sealing member 445 is of suitable dimensions for being securely received within the third receiving channel 416. The first end 445a of the second sealing member 445 is preferably made of a resiliently deformable material that allows for the first end 445a to elastically deform to accommodate a range of different profiles of the bottom surface of the drive chain elements 301 sliding thereover. As can be observed in FIG. 2, the bottom surface of the drive chain elements 301 includes spaced apart first and second arcuate projections 371,372 that are separated by a substantially flattened portion 373. As such, the second sealing member 445 acts to minimise the likelihood of debris, fluids, dust or the like that has collected in, for example, the gutter 420 migrating between the lower surface of the drive chain 300 and the drive channel 410 of the side rail 400 and into the cargo bed 110 of the vehicle 100.

It will be appreciated that the first and second sealing members 440,445 may comprise any suitable material known in the art, including rubber materials of a suitable grade and shore hardness. Preferably, the material to be used for the sealing members 440,445 demonstrates adequate levels of fluid and/or chemical resistance as well as frost and heat resistance. Additionally, the material to be used for the sealing members 440,445 suitably demonstrates a requisite level of flammability and UV resistance as typically required for automotive applications.

As shown in FIGS. 3 to 5, the side rail 400 further includes an I-shaped guide or contact element 425 disposed within the second receiving channel 415. The contact element 425 defines an upper contact surface 426 that is adapted to slidably receive, at least partly, thereon the bottom surface of the drive chain elements 301. Accordingly, the contact element 425 is preferably of a material that minimises the frictional forces between the drive chain element 301 and the underlying contact surface 426.

In cross-section, it can be observed that the body 405 of the side rail 400 includes first, second, third and fourth hollow portions 451-454. The hollow portions 451-454 are configured to reduce the effective weight of the side rail 400, whilst also maintaining a requisite strength for the structural integrity of the side rail 400. Additionally, first and second ends of the body 405 are both open ended to define a space therebetween.

The front and rear ends of the side rail 400, that is those ends adjacent the cab and tailgate of the vehicle 100 respectively, terminate in a respective end piece or cap 480a,b, shown in FIG. 1. The caps 480a,b are configured to matingly and frictionally snap or slide in place around the cross-sectional shape or configuration of the side rail 400. In addition to this, the caps 480a,b can be secured to their respective ends of the side rail 400 by means of one or more fasteners, as are known in the art. Alternatively, the caps 480a,b can be configured so as to have engagement portions (not shown) that are matingly and securely received within one or more of the hollow portions 451-454 of the body 405.

The above described relationship between the side rail 400, the drive chain 300 and the first and second sealing members 440,445 promotes any water which may enter the drive channel 410 moving into the gutter 420 and subsequently draining into a housing 510 of the drive system 500. A draining outlet (not shown) may then be made from a bottom portion of the housing 510 through the cargo bed 110 of the vehicle 100 to permit the release of debris, liquid, and the like therefrom and thereby maintaining the cargo bed 110 itself dry.

Figure 6:
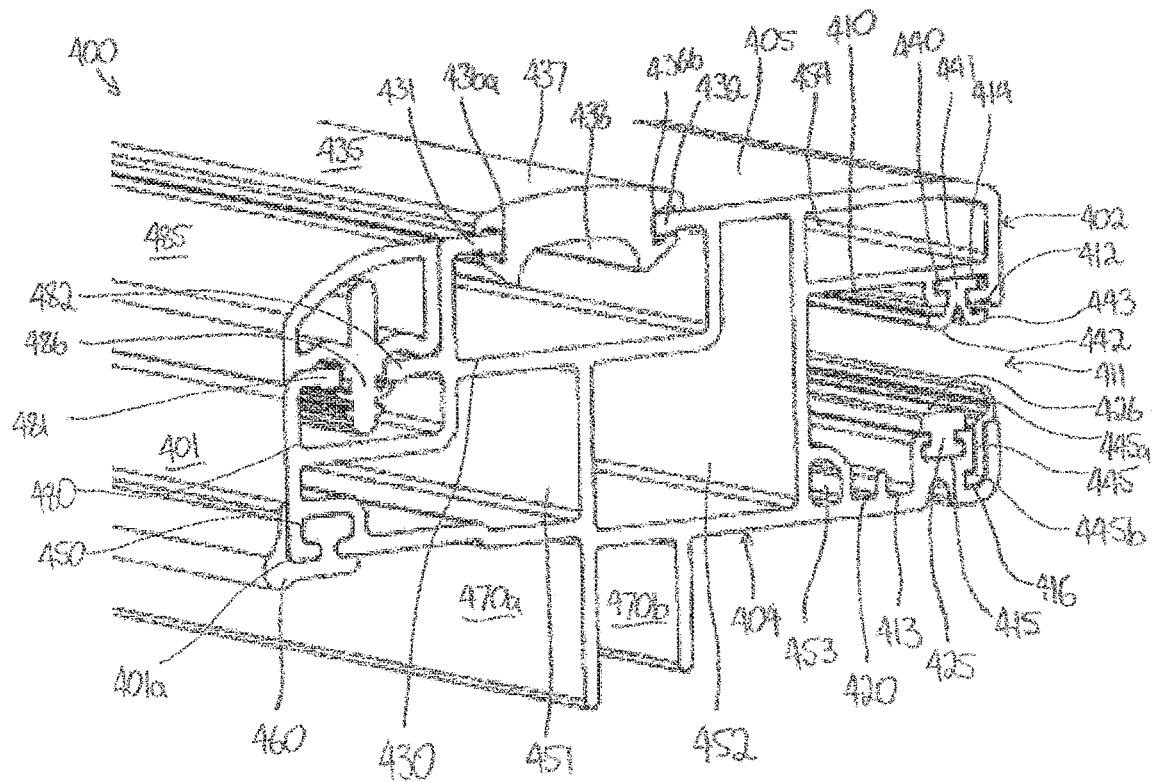
FIG. 6 illustrates an end-on perspective view of the side rail of FIG. 2 with the cover strip and the cover bar mounted thereon.

Recessed in the upper side 403 and opening upwardly therefrom is a U-shaped first support track or channel 430. As can be observed from FIGS. 3 to 5, the first support channel 430 has a pair of opposed first lip portions 431,432 that are parallel or flush with the upper side 403 and define a first slot 433 therebetween. The first support channel 430, and in particular the opposed first lip portions 431,432 are designed to receive and secure a range of automotive accessories to the side rail 400. By way of example, and as shown in FIG. 6, a removable cover strip 435 is disposed within and overlying the first slot 433 of the first support channel 430. To this end, the cover strip 435 has a rounded or convex outer surface 437 and a concave inner surface 438 and a pair of engagement channels 436a,b disposed in opposed side walls and opening outwardly or laterally therefrom. The engagement channels 436a,b are configured for matingly receiving respective opposed first lip portions 431,432. In this manner, the cover strip 435 may be used to cover the support channel 430 when not in use by another automotive accessory.

It will be appreciated that the cover strip 435 may alternatively be cut into a number of lengths or portions, with each portion engaged to and covering a section of the first support channel 430 in between, for example, one or more automotive accessories engaged or mounted therein.

The cover strip 435 can comprise any suitable material, including metals and polymeric materials, known in the art. In particular examples, the cover strip 435 comprises an antifriction material. Alternatively, the cover strip 435 can be made from an anti-slip or anti-slide material, as are known in the art.

Recessed from the first support channel 430 in the upper side 403 and adjacent the lateral side 401 of the body 405 is a second U-shaped support track or channel 480. As can be observed from FIG. 3, the second support channel 480 is disposed adjacent the first support channel 430 in a stepped arrangement, the second support channel 480 occupying a smaller cross-sectional area than the first support channel 430. Similar to the first support channel 430, the second support channel 480 includes a pair of opposed second lip portions 481,482 that define a second slot 483.

Figure 7:
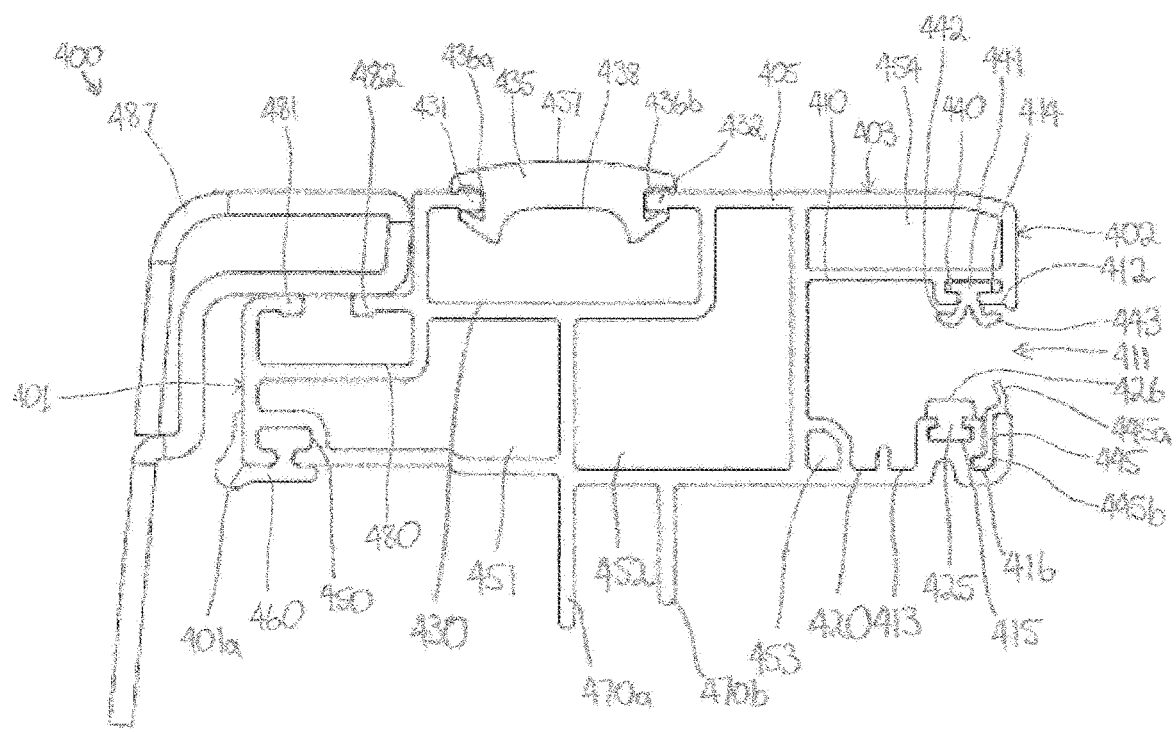
FIG. 7 is a cross-sectional view of the side rail of FIG. 2 with the cover strip and a trim element mounted thereon.
Figure 8:
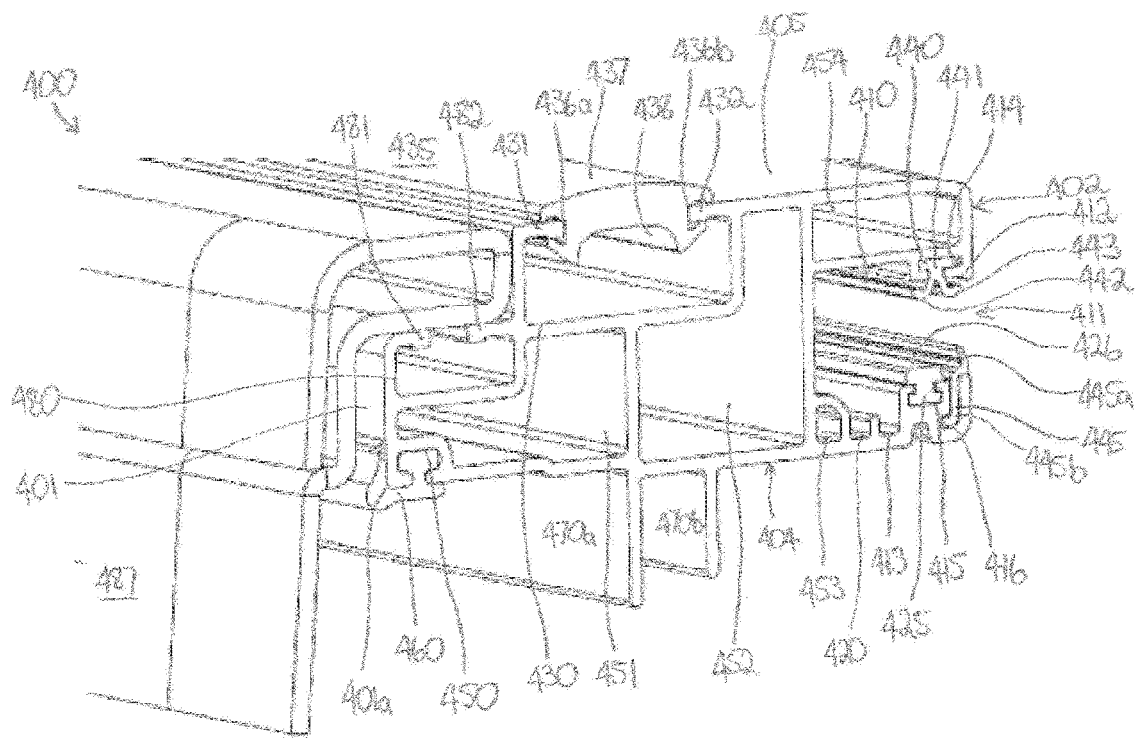
FIG. 8 illustrates an end-on perspective view of the side rail of FIG. 2 with the cover strip and the trim element mounted thereon.

Again, the second support channel 480, and in particular the opposed second lip portions 481,482 are designed to receive and secure a range of automotive accessories to the side rail 400. For example, in FIGS. 5 and 6, a removable cover bar or element 485 is engaged to the second support channel 480 by way of a ribbed engagement portion 486 extending downwardly through the second slot 483 so as to be retained in this position by contact with the second lip portions 481,482. In a further example shown in FIGS. 7 and 8, the second support channel 480 is being used to secure a right angular or L-shaped trim element 487 to the side rail 400, which extends laterally and downwardly to overlie the lateral side 401 of the body 405.

Additional automotive accessories that may be received and engaged by the first support channel 430 and/or the second support channel 480 include, but are not limited to, a railing system, a trim element, a sail plane element, a sports bar element, a canopy, a cabin guard and a storage rack.

The lower side 404 of the body 405 further comprises an outwardly or downwardly opening fourth receiving channel 450 recessed therein and disposed adjacent a lateral edge portion 401a with the lateral side 401. Disposed within the fourth receiving channel 450 is a third sealing member 460 that extends outwardly therefrom and in a right-angled fashion over the lateral edge portion 401a to overlie a lower portion of the lateral wall 401. In this way, the third sealing member 460 is configured for abutting and sealingly contacting an upper surface of a side wall 111 of the cargo bed 110 when appropriately installed on the vehicle 100.

As can be observed in FIGS. 3 to 5, the lower side 404 of the body 405 also includes a pair of spaced apart and downward or outward extending perpendicular projections 470a,b. As can be observed in FIGS. 7 and 8, the first projection 470a extends downward to terminate at a level just below that of the second projection 470b. The first projection 470a has two functions, firstly to act as an end stop for one or more clamping members (not shown) which clamp the side rail 400 to the cargo bed 100. Secondly, the first projection 470a also has a paired of threaded apertures (not shown) positioned at opposing ends that function to hold a grub screw or the like therein. These grub screws (not shown) can be used to adjust the roll top cover 1 as a whole in such way that it will preferably be appropriately mounted concentric to the cargo bed 110.

Conversely, the second projection 470b can facilitate the mounting of one or more accessory rails or supports (not shown) if required. These accessory rails (not shown) can then be used to mount or engage other accessories, such as LED lights and a cargo manager (also called inner tub cargo divider).

The side rail 400 may be made or constructed from any suitable material known in the art, including, but not limited to, metals such as aluminium (e.g., marine grade aluminium) and steel, and polymeric materials, such as plastics (e.g., reinforced plastics). In one example, the side rail 400 is made or constructed of material/s other than aluminium so as to reduce friction between it and the drive chain 300.

The above description of various example is provided for purposes of description to one of ordinary skill in the related art. It is not intended to be exhaustive or to limit the disclosure to a single disclosed example. As mentioned above, numerous alternatives and variations to the present disclosure will be apparent to those skilled in the art of the above teaching. Accordingly, while some alternative examples have been discussed specifically, other examples will be apparent or relatively easily developed by those of ordinary skill in the art. The disclosure is intended to embrace all alternatives, modifications, and variations of the examples that have been discussed herein, and other examples that fall within the spirit and scope of the disclosure.

The invention claimed is:

1. A side rail for a cargo bed of a vehicle comprising:
    an elongate body that defines a longitudinal axis;
    an axially extending drive channel disposed at a medial side of the body and defining an opening therein for receiving a drive chain, the drive channel having a recessed inner portion and a stepped outer portion adjacent the opening;
    an axially extending first support channel recessed in an upper side of the body and opening upwardly therefrom, the first support channel being U-shaped and having opposed lip portions extending toward one another; and
    an axially extending second support channel recessed in the upper side of the body and opening upwardly therefrom, the second support channel being U-shaped and having opposed lip portions extending toward one another, the second support channel disposed laterally adjacent to the first support channel.

2. The side rail of claim 1, wherein the second support channel is recessed from the first support channel to define a stepped arrangement.

3. The side rail of claim 1, further comprising a first cover element engaged with the first support channel.

4. The side rail of claim 2, further comprising a second cover element engaged with the second support channel.

5. The side rail of claim 1, wherein one of the first or second support channels is configured for receiving at least partly therein one or more automotive accessories.

6. The side rail of claim 5, wherein the one or more automotive accessories are selected from the group consisting of a railing system, a trim element, a sail plane element, a sports bar element, a canopy, a cabin guard, a storage rack and any combination thereof.

7. The side rail of claim 1, wherein front or rear end portions of the body include a respective end cap engaged thereto.

8. The side rail of claim 1, wherein the recessed inner portion defines a gutter.

9. The side rail of claim 1, further comprising:
    a first receiving channel disposed within an upper wall of the outer portion of the drive channel and extending axially therealong;
    a first sealing member disposed within the first receiving channel;
    a second receiving channel disposed opposite the first receiving channel within a lower wall of the outer portion of the drive channel and extending axially therealong; and
    a guide element disposed within the second receiving channel and projecting upwardly therefrom, the guide element having an upper contact surface for slidably contacting a surface of the drive chain.

10. The side rail of claim 9, further comprising:
    a third receiving channel positioned between and adjacent the second receiving channel and the opening; and
    a second sealing member disposed within the third receiving channel.

11. The side rail of claim 10, wherein the second sealing member curves upwardly and medially into the drive channel.

12. The side rail of claim 9, wherein the first sealing member comprises a base positioned within the first receiving channel and a pair of curved projections extending therefrom into the drive channel for contacting an upper surface of the drive chain or a slat.

13. The side rail of claim 1, further comprising:
    a fourth receiving channel recessed in a lower side of the body and extending axially therealong, the fourth receiving channel adjacent a lateral edge portion of the lower side; and
    a third sealing member disposed within the fourth receiving channel and extending laterally therefrom so as to overlie the lateral edge portion.

14. The side rail of claim 1, wherein the side rail is configured for operation of a roll top cover or a tonneau cover.

15. A side rail for a cargo bed of a vehicle comprising:
    an elongate body that defines a longitudinal axis;

an axially extending drive channel disposed at a medial side of the body and defining an opening therein for receiving a drive chain, the drive channel having a recessed inner portion and a stepped outer portion adjacent the opening;

an axially extending first support channel recessed in an upper side of the body and opening upwardly therefrom;

an axially extending second support channel recessed in the upper side of the body and opening upwardly therefrom, the second support channel disposed laterally adjacent to the first support channel;

a first receiving channel disposed within an upper wall of the outer portion of the drive channel and extending axially there along;

a first sealing member disposed within the first receiving channel;

a second receiving channel disposed opposite the first receiving channel within a lower wall of the outer portion of the drive channel and extending axially there along;

a guide element disposed within the second receiving channel and projecting upwardly therefrom, the guide element having an upper contact surface for slidably contacting a surface of the drive chain;

a third receiving channel positioned between and adjacent the second receiving channel and the opening; and a second sealing member disposed within the third receiving channel.

16. The side rail of claim 15, wherein the second sealing member curves upwardly and medially into the drive channel.

17. The side rail of claim 15, further comprising:

a fourth receiving channel recessed in a lower side of the body and extending axially there along, the fourth receiving channel adjacent a lateral edge portion of the lower side; and a third sealing member disposed within the fourth receiving channel and extending laterally therefrom so as to overlie the lateral edge portion.

18. A side rail for a cargo bed of a vehicle comprising:

an elongate body that defines a longitudinal axis;

an axially extending drive channel disposed at a medial side of the body and defining an opening therein for receiving a drive chain, the drive channel having a recessed inner portion and a stepped outer portion adjacent the opening;

an axially extending first support channel recessed in an upper side of the body and opening upwardly therefrom;

an axially extending second support channel recessed in the upper side of the body and opening upwardly therefrom, the second support channel disposed laterally adjacent to the first support channel;

a first receiving channel disposed within an upper wall of the outer portion of the drive channel and extending axially there along;

a first sealing member disposed within the first receiving channel, the first sealing member comprising a base positioned within the first receiving channel and a pair of curved projections extending therefrom into the drive channel for contacting an upper surface of the drive chain or a slat;

a second receiving channel disposed opposite the first receiving channel within a lower wall of the outer portion of the drive channel and extending axially there along; and a guide element disposed within the second receiving channel and projecting upwardly therefrom, the guide element having an upper contact surface for slidably contacting a surface of the drive chain.

* * * * *